(12) United States Patent
Turetzky et al.

(10) Patent No.: US 7,877,104 B2
(45) Date of Patent: Jan. 25, 2011

(54) METHOD FOR SYNCHRONIZING A RADIO NETWORK USING END USER RADIO TERMINALS

(75) Inventors: Gregory B. Turetzky, San Jose, CA (US); Lionel J. Garin, Palo Alto, CA (US)

(73) Assignee: SiRF Technology Inc., San Jose, CA (US)

( * ) Notice: Subject to any disclaimer, the term of this patent is extended or adjusted under 35 U.S.C. 154(b) by 1968 days.

(21) Appl. No.: 10/154,138

(22) Filed: May 21, 2002

(65) Prior Publication Data

US 2002/0173322 A1 Nov. 21, 2002

Related U.S. Application Data

(60) Provisional application No. 60/292,774, filed on May 21, 2001.

(51) Int. Cl.
*H04B 15/00* (2006.01)
(52) U.S. Cl. ............... 455/502; 455/456.1; 455/456.6; 342/357.64
(58) Field of Classification Search .......... 455/502, 455/456.1, 456.3, 456.5, 456.6; 342/357.64
See application file for complete search history.

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Jane et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,202,829 A | 4/1993 | Geier | |
| 5,225,842 A | 7/1993 | Brown et al. | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |

(Continued)

FOREIGN PATENT DOCUMENTS

EP 0511741 A1 11/1992

(Continued)

*Primary Examiner*—Nay A Maung
*Assistant Examiner*—Angelica M Perez
(74) *Attorney, Agent, or Firm*—Ratner Prestia

(57) ABSTRACT

The present invention discloses a method and system for monitoring a wireless network clock compared to an absolute time scale using the user mobile stations themselves. The major advantage is the capability to transfer GPS time to a Mobile Station in a wireless network, and thus to decrease the time necessary for the mobile receiver to perform position calculations, with minimal additional hardware required by the network.

20 Claims, 2 Drawing Sheets

U.S. PATENT DOCUMENTS

| | | | |
|---|---|---|---|
| 5,347,536 | A | 9/1994 | Meehan |
| 5,379,224 | A | 1/1995 | Brown et al. |
| 5,402,347 | A | 3/1995 | McBurney et al. |
| 5,416,712 | A | 5/1995 | Geier et al. |
| 5,420,593 | A | 5/1995 | Niles |
| 5,440,313 | A | 8/1995 | Osterdock et al. |
| 5,450,344 | A | 9/1995 | Woo et al. |
| 5,504,684 | A | 4/1996 | Lau et al. |
| 5,592,173 | A | 1/1997 | Lau et al. |
| 5,625,668 | A | 4/1997 | Loomis et al. |
| 5,663,734 | A | 9/1997 | Krasner |
| 5,663,735 | A | 9/1997 | Eshenbach |
| 5,697,051 | A * | 12/1997 | Fawcett ............... 455/13.2 |
| 5,781,156 | A | 7/1998 | Krasner |
| 5,786,789 | A | 7/1998 | Janky |
| 5,812,087 | A | 9/1998 | Krasner |
| 5,825,327 | A | 10/1998 | Krasner |
| 5,828,694 | A | 10/1998 | Schipper |
| 5,831,574 | A | 11/1998 | Krasner |
| 5,841,396 | A | 11/1998 | Krasner |
| 5,845,203 | A | 12/1998 | LaDue |
| 5,854,605 | A | 12/1998 | Gildea |
| 5,874,914 | A | 2/1999 | Krasner |
| 5,877,724 | A | 3/1999 | Davis |
| 5,877,725 | A | 3/1999 | Kalafus |
| 5,883,594 | A | 3/1999 | Lau |
| 5,884,214 | A | 3/1999 | Krasner |
| 5,889,474 | A | 3/1999 | LaDue |
| 5,903,654 | A | 5/1999 | Milton et al. |
| 5,907,809 | A | 5/1999 | Molnar et al. |
| 5,917,444 | A | 6/1999 | Loomis et al. |
| 5,920,283 | A | 7/1999 | Shaheen et al. |
| 5,923,703 | A | 7/1999 | Pon et al. |
| 5,926,131 | A | 7/1999 | Sakumoto et al. |
| 5,936,572 | A | 8/1999 | Loomis et al. |
| 5,943,363 | A | 8/1999 | Hanson et al. |
| 5,945,944 | A | 8/1999 | Krasner |
| 5,963,582 | A | 10/1999 | Stansell, Jr. |
| 5,977,909 | A | 11/1999 | Harrison et al. |
| 5,982,324 | A | 11/1999 | Watters et al. |
| 5,987,016 | A | 11/1999 | He |
| 5,999,124 | A | 12/1999 | Sheynblat |
| 6,002,362 | A | 12/1999 | Gudat |
| 6,002,363 | A | 12/1999 | Krasner |
| 6,009,551 | A | 12/1999 | Sheynblat |
| 6,016,119 | A | 1/2000 | Krasner |
| 6,041,222 | A | 3/2000 | Horton et al. |
| 6,047,017 | A | 4/2000 | Cahn et al. |
| 6,052,081 | A | 4/2000 | Krasner |
| 6,061,018 | A | 5/2000 | Sheynblat |
| 6,064,336 | A | 5/2000 | Krasner |
| 6,104,338 | A | 8/2000 | Krasner |
| 6,104,340 | A | 8/2000 | Krasner |
| 6,107,960 | A | 8/2000 | Krasner |
| 6,111,540 | A | 8/2000 | Krasner |
| 6,131,067 | A | 10/2000 | Girerd et al. |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,192,247 | B1 * | 2/2001 | Dillon et al. ............... 455/446 |
| 6,473,030 | B1 * | 10/2002 | McBurney et al. ...... 342/357.43 |
| 6,603,978 | B1 * | 8/2003 | Carlsson et al. ............ 455/502 |
| 2001/0039192 | A1 * | 11/2001 | Osterling et al. ............ 455/502 |
| 2002/0004398 | A1 * | 1/2002 | Ogino et al. ................ 455/456 |
| 2002/0123352 | A1 * | 9/2002 | Vayanos et al. ............ 455/456 |
| 2002/0160788 | A1 * | 10/2002 | Duffett-Smith et al. ..... 455/456 |

FOREIGN PATENT DOCUMENTS

| | | |
|---|---|---|
| EP | 0511741 B1 | 11/1992 |
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |

* cited by examiner

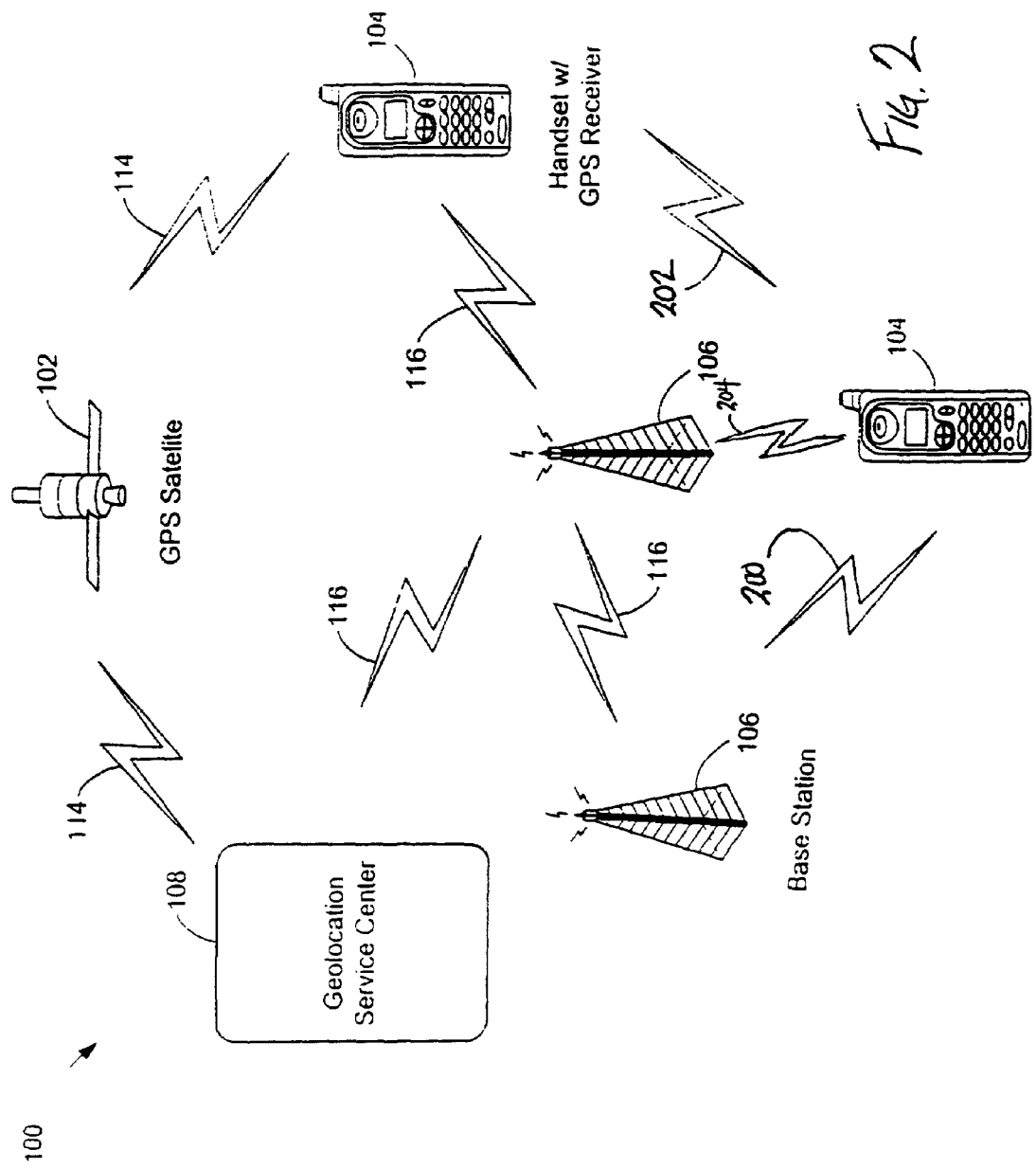

METHOD FOR SYNCHRONIZING A RADIO NETWORK USING END USER RADIO TERMINALS

CROSS REFERENCE TO RELATED APPLICATIONS

This application claims priority under 35 U. S. C. §119(e) of U.S. Provisional Patent Application No. 60/292,774, filed May 21, 2001, entitled "METHOD FOR SYNCHRONIZING A RADIO NETWORK USING END USER RADIO TERMINALS," by Gregory B. Turetzky et al, which application is incorporated by reference herein.

BACKGROUND OF THE INVENTION

1. Field of the Invention

The present invention relates in general to Global Satellite System (GSS) receivers, and in particular to a method for synchronizing a radio network using end user radio terminals.

2. Description of the Related Art

Cellular telephony, including Personal Communication System (PCS) devices, has become commonplace. The use of such devices to provide voice, data, and other services, such as Internet access, has provided many conveniences to cellular system users. Further, other wireless communications systems, such as two-way paging, trunked radio, Specialized Mobile Radio (SMR) that is used by police, fire, and paramedic departments, have also become essential for mobile communications.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the basestation (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position. Further, GPS data that is supplied to the mobile telephone can be used by the mobile telephone user for directions, latitude and longitude positions (locations or positions) of other locations or other mobile telephones that the cellular user is trying to locate, determination of relative location of the cellular user to other landmarks, directions for the cellular user via internet maps or other GPS mapping techniques, etc. Such data can be of use for other than E911 calls, and would be very useful for cellular and PCS subscribers.

The approach in Krasner, however, is limited by the number of data links that can be connected to a GPS-dedicated data supply warehouse. The system hardware would need to be upgraded to manage the additional requirements of delivering GPS information to each of the cellular or PCS users that are requesting or requiring GPS data, which requirements would be layered on top of the requirements to handle the normal voice and data traffic being managed and delivered by the wireless system.

Further, GPS receivers in cellular telephones may not always have an unobstructed view of the sky to be able to receive a sufficient number of satellite signals to perform position calculations. The GPS receiver may need additional information, such as Doppler, ephemeris, or time aiding to determine position, or, in other situations, to determine a more accurate position for the GPS receiver.

It can be seen, then, that there is a need in the art for delivering GPS data to wireless communications systems, including cellular and PCS subscribers, in an efficient manner. It can also be seen that there is a need in the art for GPS capable cellular and PCS telephones. It can also be seen that there is a need in the art to be able to aid the GPS receiver for position determination. It can also be seen that there is a need in the art to be able to aid the GPS receiver to provide more precise position determination. It can also be seen that there is a need in the art for a large cellular system that can use and/or supply GPS information to cellular users for a number of applications, including E911 without the requirement of geographically proximate basestations.

The concept of locating a mobile unit by triangulating a set of ranges from either a set of fixed points (such as cellular transmitters) or mobile transmitters (such as GPS satellites) have a common requirement that the time of transmission is known. This implies that the time at all transmitters must be common, or the differences known. In many systems today, this information is not immediately available since the systems are focused on data rather than ranging.

SUMMARY OF THE INVENTION

To minimize the limitations in the prior art described above, and to minimize other limitations that will become apparent upon reading and understanding the present specification, the present invention discloses a system, device, and method for creating a common time base for various types of transmitters to aid a mobile device in determining the position of the mobile device.

The present invention comprises methods and systems for synchronizing unsynchronized radio networks. One method of performing the present invention comprises determining GPS time at a mobile GPS receiver, comparing the determined GPS time to a second time source, storing the offset between the GPS time and the second time source, and using the stored offset to acquire GPS satellites. The storing of the offset can be performed at either the mobile GPS receiver or at a server connected to the radio network. The offset can be used by the mobile GPS receiver that stored the offset, or at another GPS receiver to assist the other GPS receiver in the acquisition of GPS satellite signals. The comparison can be performed at the mobile GPS receiver, or at another location, typically at the server.

The second time source can be either within the cellular infrastructure, or outside of the cellular infrastructure, e.g., DTV, local area networks (bluetooth systems), GSM, TDMA cellular time, WCDMA or CDMA2000 cellular time, other 3G cellular network time, or any other radio network time source that is unsynchronized. The offset can be transferred from one mobile GPS receiver to another using the radio network, e.g., a communications system, a cellular telephone network, etc., or directly from one mobile GPS receiver to another.

A second method of performing the present invention comprises computing an offset between GPS time and a local time source, storing the offset, and using the stored offset at a later time to aid in the acquisition of at least one GPS satellite signal.

Again, the offset can be computed by the mobile GPS receiver, and the local time source can be one of many time sources, e.g., digital television (DTV), GSM time, and TDMA cellular time. The offsets can be computed by more than one mobile receiver, and aggregated or averaged as desired. The aggregate or average can be used to model the drift of the local time source, as well as to model or determine the tate of change, the rate of the offset change, or the expected error of the local time source.

The offset can also be used by internet service providers (ISPs) to pass the offset information from one user to another via the internet server. This can be transmitted using the internet via the cellular infrastructure, a local area network (bluetooth), or via Short Messaging System (SMS) channels.

It is an object of the present invention to deliver GPS data to wireless communications systems, including cellular and PCS subscribers, in an efficient manner. It is another object of the present invention to provide GPS capable cellular and PCS telephones. It is another object of the present invention to provide an aid the GPS receiver for position determination. It is another object of the present invention to provide an aid the GPS receiver to provide more precise position determination. It is another object of the present invention to provide for a large cellular system that can use and/or supply GPS information to cellular users for a number of applications, including E911 without the requirement of geographically proximate basestations. It is another object of the present invention to determine a common timebase for a system which does not have one inherently (not synchronized).

BRIEF DESCRIPTION OF THE DRAWINGS

Referring now to the drawings in which like reference numbers represent corresponding parts throughout:

FIG. 2 illustrates a typical embodiment of the present invention.

DETAILED DESCRIPTION OF THE DRAWINGS

Figure 1:
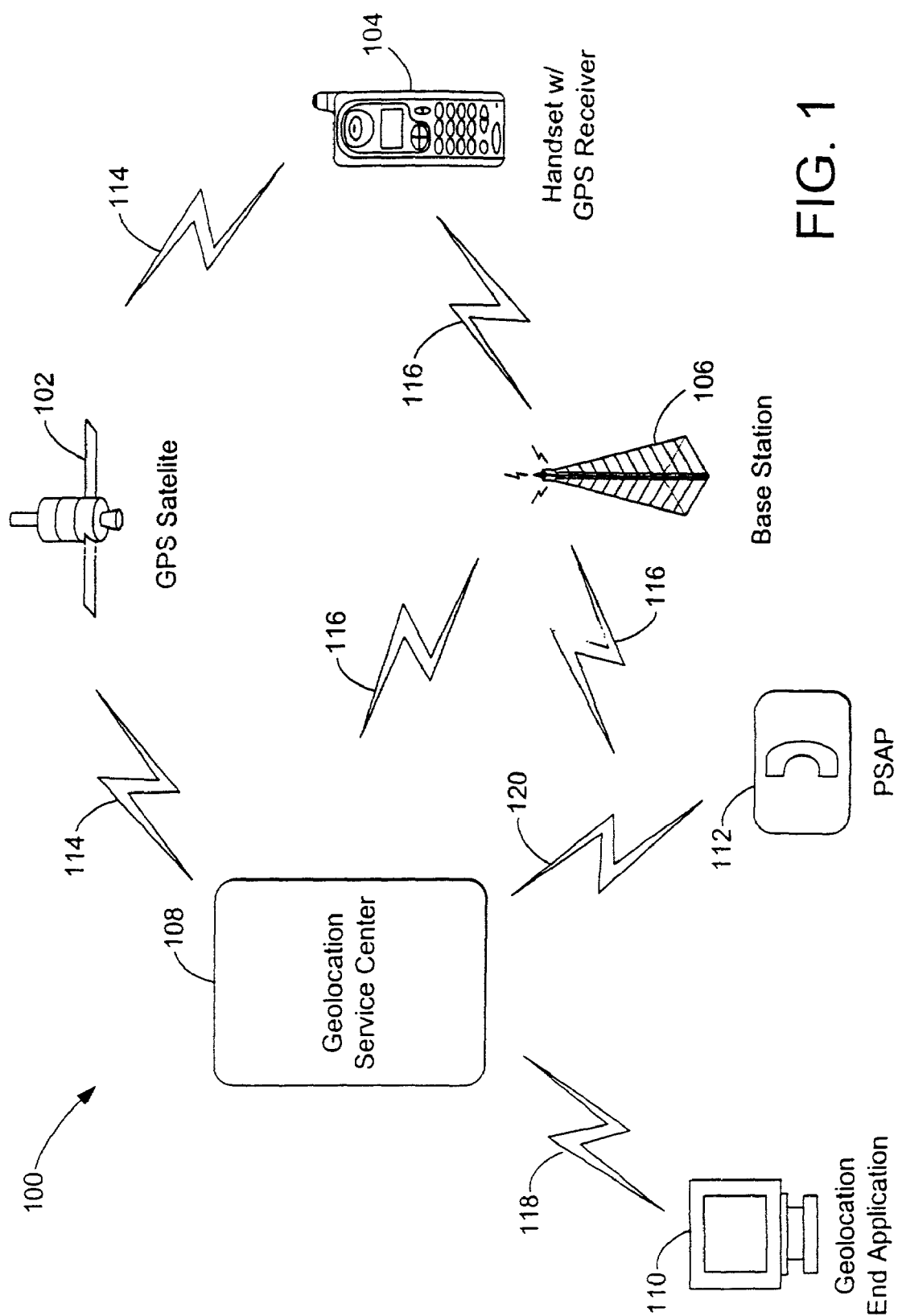
FIG. 1 illustrates a typical GPS architecture.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

GPS Architecture

FIG. 1 illustrates a typical GPS architecture.

The wireless handset location technology of the present invention uses GPS technology in support of various wireless handset devices for the implementation of E911 and geo-location services. By taking the advantage of the low cost, low power, high performance and high accuracy GPS receivers enabled by the present invention, as well as the wireless network communication services, the wireless handset location technology of the present invention provides highly reliable and economical solutions to the Wireless Aided GPS. The wireless handset location technology of the present invention supports all kinds of geo-location services, and also accommodates wide range of wireless communication platforms, including CDMA, TDMA, AMP, and even pager systems. FIG. 1 portrays the concept of wireless handset location technology.

System 100 illustrates a GPS satellite 102, which is illustrative of the constellation of GPS satellites 102 that are in orbit, a wireless handset 104 that comprises a GPS receiver, a base station 106, a geolocation (server) service center 108, a geolocation end application 110, and a Public Safety Answering Point (PSAP) 112.

The GPS satellite 102 transmits spread spectrum signals 114 that are received at the wireless handset 104 and the geolocation server 108. For ease of illustrative purposes, the other GPS satellites 102 are not shown, however, other GPS satellites 102 also are transmitting signals 114 that are received by the wireless handset 104 and the geolocation server 108. If the wireless handset 104 can receive strong enough signals 114, the GPS receiver in the wireless handset 104 can compute the position of the wireless handset 114 as is typically done in the GPS system. However, wireless handsets are typically not able to receive strong enough signals 114, or are not able to receive signals from enough GPS satellites 102 to autonomously compute the position of the wireless handset 104, but can still communicate with base station 106. Thus, base station 106 can communicate information via signals 116 to handset 104 to allow handset 104 to compute the location, or can communicate information from handset 104 to the geolocation server 108 to allow the geolocation server 108 to compute the position of the handset 104. If the basestation 106 is transferring information to the handset 104 to allow the handset 104 to compute position, it is called "wireless-aided GPS," whereas when the basestation 106 transfers information from the handset 104 to the geolocation server 108 for the geolocation server 108 to compute the position of the handset 104 it is called "network-centric GPS."

Geolocation server also communicates with geolocation application 110 via signals 118 and with PSAP 112 via signals 120. These signals 118 and 120 can either be via wireless links or can be through the landline telephone network or other wire-based networks.

The wireless handset 104 location technology of the present invention comprises two major service systems: the wireless handset 104 with the GPS receiver of the present invention and the geo-location server 108 containing geo-location software modules.

The handset 104 comprises a typical wireless handset 104 section that performs the call-processing (CP) function, and a GPS section for position computation, pseudorange measurement, and other GPS functions performed at the handset 104 of the present invention. A serial communication link, or other communications link, performs the communications between the CP section and the GPS section. A collection of hardware lines is utilized to transmit signals between the CP and GPS section.

Overview

One key piece of information for acquisition aiding is accurate time. In systems where time is synchronized throughout the network, the offset to absolute time is constant. However, many systems have some notion of time but it is not synchronized between zones/transmitters nor is its relationship to a fixed time, e.g., GPS time, controlled in any manner. Other approaches address this issue by deploying a large number of continuously operating, fixed sites that constantly monitor the relative offset of each zone/cell and a fixed reference like GPS often called a Local Measurement Unit (LMU). This invention addresses an improved method that does not require additional fixed infrastructure.

Within a phone system, any phone that can autonomously calculate its GPS position also solves for GPS time. The phone can then calculate the offset between the "system" time as determined by the CP portion and GPS time. The offset and the cell it is associated with are the key pieces of information required to make it work.

Each transmitter/cell site has a clock that can drift, etc. when a phone gets a fix in that cell site, the phone gets GPS time from the GPS signal, and can calculate the offset between GPS time and the cell site clock. This offset can be stored in the phone, and/or transmitted to the network for storage in a database.

Each time the phone goes through the cell, the offset can be updated, and drift rates can be determined. These drift rates can be transmitted to the network for assisting other phones.

This concept can also be used in conjunction with other localized networks like Nextel, SMS, FRS, etc. where a group of phones or mobile communications devices can help each other. For example, where a phone gets a fix, that phone can transmit offset information, or transmit other information via a non-cellular network, such as SMS, or CB bands, or whatever, to other phones that use that network, or are part of a group of devices used by the same company.

Overview of Handset-to-Handset Aiding

The main focus of wireless aided GPS is to accurately and quickly measure the position of a wireless mobile phone by using the measurements of an embedded GPS receiver. A Geolocation Server in the wireless network, as described above, can provide assistance, such as satellite position information, approximate Mobile System location, etc., which normally would be collected from the GPS satellites themselves.

Another important class of assistance the network can provide to the embedded GPS receiver is frequency assistance. This refers to the capability for the receiver to know its clock frequency offset, comparing it to the carrier frequency received from the Base Station on which the Mobile Station is tuned to. Usually the quality of the Base Station master clock is one order of magnitude better than the one embedded in the Mobile Station (the mobile telephone). As the receiver clock error is a major part of the Doppler frequency uncertainty, this frequency offset measurement is used to significantly reduce the Doppler search domain the GPS receiver has to explore, and thus to reduce the time required before the first position solution is provide to the end user. This provides the capability for a network to provide local frequency information to the receiver, to reduce another dimension in the search space, the Doppler uncertainty.

What the GPS receiver actually needs is an accurate GPS absolute timing information, to predict from its own approximate location and satellite position information, the pseudo random code offset at the approximate location.

From a time synchronization point of view, there are several categories of wireless networks. Code Division Multiple Access (CDMA) (TIA/IS-95B) standard uses a GPS time reference standard at every Base Station, and all transmission frames are absolutely synchronized onto GPS time. Therefore, a Mobile Station, by observing particular transitions on frame, master frame or hyper frame, can predict absolute GPS time within tens of microseconds, including radio transmission delay and group delays inside the Mobile Station.

However, other classes of wireless networks, e.g., Time Division Multiple Access (TDMA), GSM, Analog Mobile Phone System (AMPS), DTV, etc., are not synchronized onto GPS time. Still, the accuracy, precision and stability of the master clock used at the Base Stations is quite good, and slowly varies relative to GPS time. Any timing information derived solely from such a system is less valuable, as there is no way to derive absolute GPS time from it. The time offset and frequency drift are very stable compared to GPS time, and can be monitored at relatively large intervals. This information is good enough for the MS to indirectly derive absolute GPS time from observing timing events on transmitted frame. The present invention enables such a derivation to be used in determining approximate GPS time for the mobile GPS receiver in order to reduce the Time To First Fix (TTFF) as well as providing a more accurate position calculation for the mobile GPS receiver.

One solution that has been proposed is to locate stationary monitoring entities, called LMU (Local Measurement Units), which are in radio visibility of several Base Stations in a given area. They consist of a wireless section and a GPS timing receiver. At intervals, they measure time offset and frequency drift of every BS in the area, relative to GPS time. As one LMU can cover only a few Base Stations, the overlay monitoring network can become quite large and expensive. It necessitates communication links between the LMU's and a central network entity, which logs this information per BS, merges information from different sources (if several LMU's monitor the same Base Station), and deliver this information to a Geolocation Server if time assistance has to be delivered to a particular MS in the BS's visibility area. This requires several pieces of additional network infrastructure, as well as additional software and maintenance costs for the network operator to enable such a feature.

The present invention, however, overcomes this limitation by reducing or eliminating the need of LMU's, and assign the LMU task of determining the time offset and frequency drift to the Mobile Stations themselves. Each Mobile station thus acts as a "Virtual" LMU (VLMU), and can report the offset and drift either to the geolocation server or directly to other mobile stations via the network.

A Mobile Station (S) already consists of a wireless section and a GPS receiver. During the position computation (at MS or in the network), a byproduct is the exact GPS time used to calculate the MS position. As long as the MS can capture events in both network time and GPS time, or at least store network time and GPS time in a matrix, then comparisons between network time and GPS time can be made by the mobile station such that any computation of the GPS position by the mobile station can be reported in GPS and network time. Over time, such a storage of GPS versus network time will give both a clock offset and a drift component to the network clock at each base station. The mobile station can then send this information via the network to other mobile stations, either directly or via a server, preferably the geolocation server, located in the network infrastructure.

Furthermore, the MS can compute the offset in the case where the MS has autonomous positioning capability. Even if the network does not have a geolocation server to do GPS computation, the network can simply store and reforward these offsets to other MS in the network. Furthermore, non-network related storage that can be accessed via a datalink such as SMS or GPRS can also be used such that independent service providers could store and forward time assistance to other MS units independent of the network. The network essentially learns the offset and drift by the repeated calculations of the handsets that use each base station's clock for prediction.

FIG. 2 illustrates a typical embodiment of the present invention.

Signals 116 in the present invention can now include the time offset and/or the drift determined by the handset 104. Further, the present invention contemplates other types of signals, which can be dedicated signals 200, which can be sent by handset 104 to base station 106, that are the determined offset and drift components, which can be sent to geolocation service center 108 if desired.

Further, base station 106 can also store the clock offset and drift components at the base station 106. As such, signals 204 from the base station 106 can be sent to handset 104 to tell handset 104 prior to any acquisition the most recently determined offset, and a drift component, and handset 104 can either use the determined offset, or calculate a new offset given the drift component from base station 104, for use in acquisition of the GPS satellites 102.

Base station 106 can be bypassed altogether in systems 100 that support handset 104 to handset 104 direct communications via signals 202. Such signals 202 can contain the drift and offset information and therefore can be shared between handsets 104 in the same general geographic region.

Process Flow

One possible process flow can be described as follows:

Using satellite position information available at the server expressed in absolute GPS time, the Server computes satellite position information time tagged in Absolute GPS time.

The Geolocation Server retrieves from a database in the network the offset and drift, of the particular Base Station the MS is tuned to, time tagged in absolute GPS time.

The Geolocation Server converts Absolute GPS time tag into BS local time tag, and sends it along with satellite position information The time error and possibly frequency drift computed from MS GPS measurements are sent to the main database along with the BS ID, and added to the already logged information, to be used by the next MS requiring a geolocation.

Alternate Implementations include:

The Geolocation Server can send assistance information to MS in GPS absolute time, along with time offset and frequency drift.

Some networks may not have a Geolocation Server and thus cannot provide satellite position information at all. However, if the MS computes the offset and saves it, then for future starts the MS can use the BS time as a highly accurate measure of elapsed time. On future starts, the MS can use this time to produce its own satellite position information. This eliminates the need for timekeeping in the MS when the MS is off which can save battery life.

In a network where MS to MS communication is allowed, the offsets could be shared directly.

In an MS which has independent access to a database such as the Internet through WAP, other similar MS could retrieve the stored offsets.

The MS can also build up a database of offsets and since the BS clocks are stable for long periods, that information would be useful when the MS returned to that BS. Thus, when the mobile GPS receiver returns to a known cell site at a later time, the mobile GPS receiver already knows the offset between the cell site clock and GPS time, making a TTFF shorter for that mobile GPS receiver. This allows for the time synchronization, and the stored offset, both of which are transmitter dependent, to be related to a transmitter ID.

The present invention also allows for a synchronization database to be stored in the system, or at a handset if desired, that comprises offsets and other data for each transmitter ID (cell site and/or handset). The database can contain, for example, transmitter ID numbers, for both cell site ID's and handset ID's if desired, transmitter position, transmitter time offset, estimated transmitter time drift, time of last update, estimated uncertainty of offset, and other items as desired.

Such a database can be stored in a server on the system, in the handset directly, or can be accessed via the internet The database can be updated by the handset if the handset has more recent data, or the handset can download the database if the handset has older data, or any combination of the two.

Several Wireless Air Interface Networks are not synchronized to GPS absolute time scale or another absolute time scale, and could greatly benefit from the invention; among them the European GSM system and the Japanese PDC systems.

This method would completely eliminate the need of an overlay network of Local Measurement Units (LMUs) dedicated necessary in another proposed method. This saves money and allows rollout to happen quicker. Furthermore, during rollout when the geolocation capable MS may be in place before the network infrastructure is upgraded, the MS can better calculate its own aids and potentially share simply the offset with other MS. This "sharing" can happen through a non-radio network based source such as a website. This makes having autonomous GPS capable MS an important part of a cellular network.

CONCLUSION

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention. Further, although described with respect to a cellular telephone system, other wireless or wire-based systems can be used in place of or in conjunction with the cellular system herein described without departing from the scope of the present invention.

The present invention comprises methods and systems for synchronizing unsynchronized radio networks. One method of performing the present invention comprises determining GPS time at a mobile GPS receiver, comparing the determined GPS time to a second time source, storing the offset between the GPS time and the second time source, and using the stored offset to acquire GPS satellites. The storing of the offset can be performed at either the mobile GPS receiver or at a server connected to the radio network. The offset can be used by the mobile GPS receiver that stored the offset, or at another GPS receiver to assist the other GPS receiver in the acquisition of GPS satellite signals. The comparison can be performed at the mobile GPS receiver, or at another location, typically at the server.

The second time source can be either within the cellular infrastructure, or outside of the cellular infrastructure, e.g., DTV, local area networks (bluetooth systems), GSM, TDMA cellular time, other 3G networks such as WCDMA or CDMA2000, or any other radio network time source that is unsynchronized. The offset can be transferred from one mobile GPS receiver to another using the radio network, e.g., a communications system, a cellular telephone network, etc., or directly from one mobile GPS receiver to another.

A second method of performing the present invention comprises computing an offset between GPS time and a local time source, storing the offset, and using the stored offset at a later time to aid in the acquisition of at least one GPS satellite signal.

Again, the offset can be computed by the mobile GPS receiver, and the local time source can be one of many time sources, e.g., digital television DTV), GSM time, and TDMA cellular time. The offsets can be computed by more than one mobile receiver, and aggregated or averaged as desired. The aggregate or average can be used to model the drift of the local time source, as well as to model or determine the rate of change, the rate of the offset change, or the expected error of the local time source.

The offset can also be used by internet service providers ISPs) to pass the offset information from one user to another via the internet server. This can be transmitted using the internet via the cellular infrastructure, a local area network (bluetooth), or via Short Messaging System (SMS) channels.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto and the equivalents thereof.

What is claimed is:

1. A method for synchronizing an unsynchronized radio network, comprising:
    determining GPS time at a mobile GPS receiver which is not synchronized to the radio network;
    comparing the determined GPS time to a second time source;
    storing an offset between the GPS time and the second time source to synchronize the mobile GPS receiver to the radio network; and
    using the stored offset to acquire GPS satellites.

2. The method of claim 1, wherein the storing is performed at the mobile GPS receiver.

3. The method of claim 2, wherein the stored offset is used at a second mobile GPS receiver.

4. The method of claim 2, wherein the comparing is performed at the mobile GPS receiver.

5. The method of claim 4, wherein the second time source is outside of a cellular infrastructure.

6. The method of claim 5, wherein the second time source is a time source selected from a group comprising digital television (DTV), GSM time, TDMA cellular time, WCDMA cellular time, or CDMA2000 cellular time.

7. The method of claim 5, wherein the stored offset is used at the mobile GPS receiver at a later time.

8. The method of claim 5, wherein the stored offset is used at a second mobile GPS receiver.

9. The method of claim 8, wherein the stored offset is transmitted from the first mobile GPS receiver to the second mobile GPS receiver through a communication system.

10. The method of claim 9, wherein the transmitted stored offset is transmitted through a cellular telephone system.

11. The method of claim 9, wherein the storing is performed other than at the mobile GPS receiver.

12. A method for synchronizing an unsynchronized radio network, comprising:
    computing an offset between GPS time and a local time source where the offset is computed by a mobile GPS receiver;
    storing the offset; and
    using the stored offset at a later time to aid in the acquisition of at least one GPS satellite signal.

13. The method of claim 12, wherein the local time source is selected from a group comprising: digital television (DTV), GSM time, TDMA cellular time, WCDMA cellular time, or CDMA2000 cellular time.

14. The method of claim 13, wherein the offset is computed by more than one mobile GPS receiver.

15. The method of claim 14, wherein the offset is aggregated.

16. The method of claim 14, wherein the offset computed by each mobile GPS receiver is averaged to determine an average offset.

17. The method of claim 16, wherein the offset computed by each mobile GPS receiver is used to model the drift of the local time source.

18. The method of claim 16, wherein the modeled drift is used to determine at least one of a group comprising: rate of change of the local time source, rate of offset of the local time source, and expected error of the local time source.

19. The method of claim 16, wherein the offset is used in an internet-enable cellular telephone to aid other internet-enabled cellular telephones from the interne server.

20. The method of claim 19, wherein the offset is transmitted from one cellular telephone to another using one of a group comprising SMS, a cellular telephone infrastructure, and a local area network.

* * * * *

UNITED STATES PATENT AND TRADEMARK OFFICE
CERTIFICATE OF CORRECTION

| | | |
|---|---|---|
| PATENT NO. | : 7,877,104 B2 | Page 1 of 1 |
| APPLICATION NO. | : 10/154138 | |
| DATED | : January 25, 2011 | |
| INVENTOR(S) | : Gregory B. Turetzky and Lionel J. Garin | |

It is certified that error appears in the above-identified patent and that said Letters Patent is hereby corrected as shown below:

Column 3, line 11 "tate" should be --rate--.
Column 6, line 35 "(S)" should be --(MS)--.

Signed and Sealed this
Nineteenth Day of April, 2011

David J. Kappos
*Director of the United States Patent and Trademark Office*